United States Patent Office 2,985,247
Patented May 23, 1961

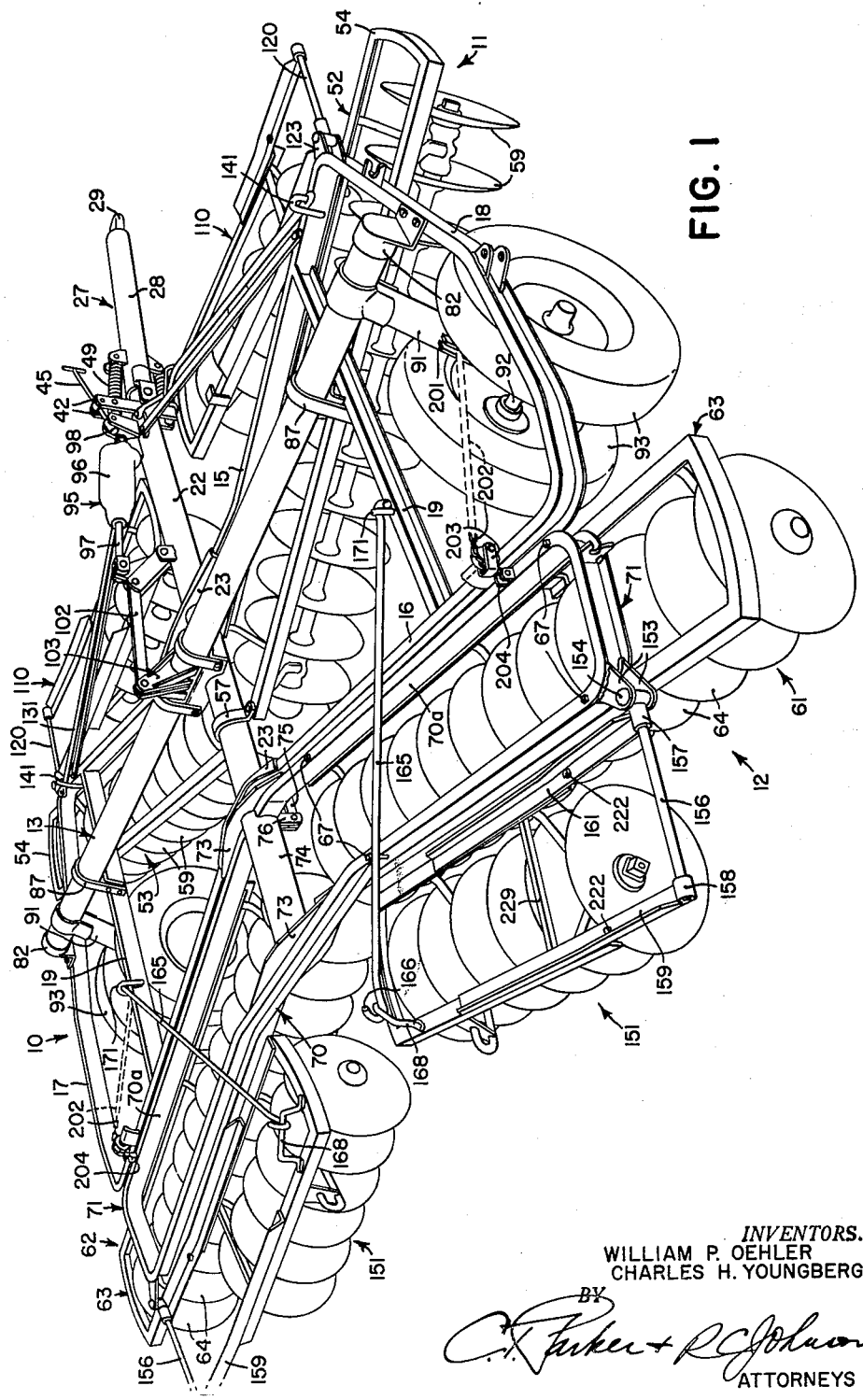

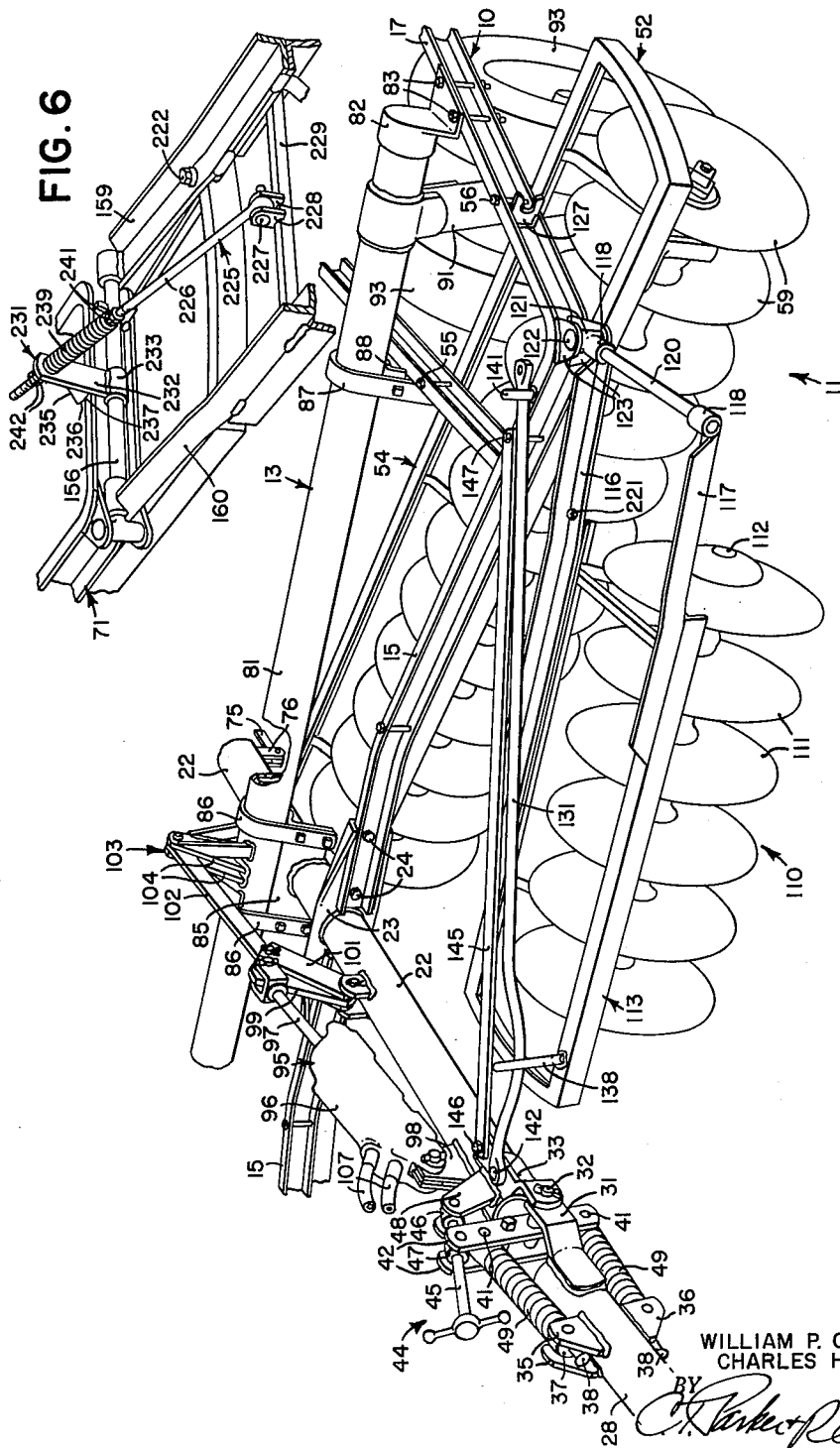

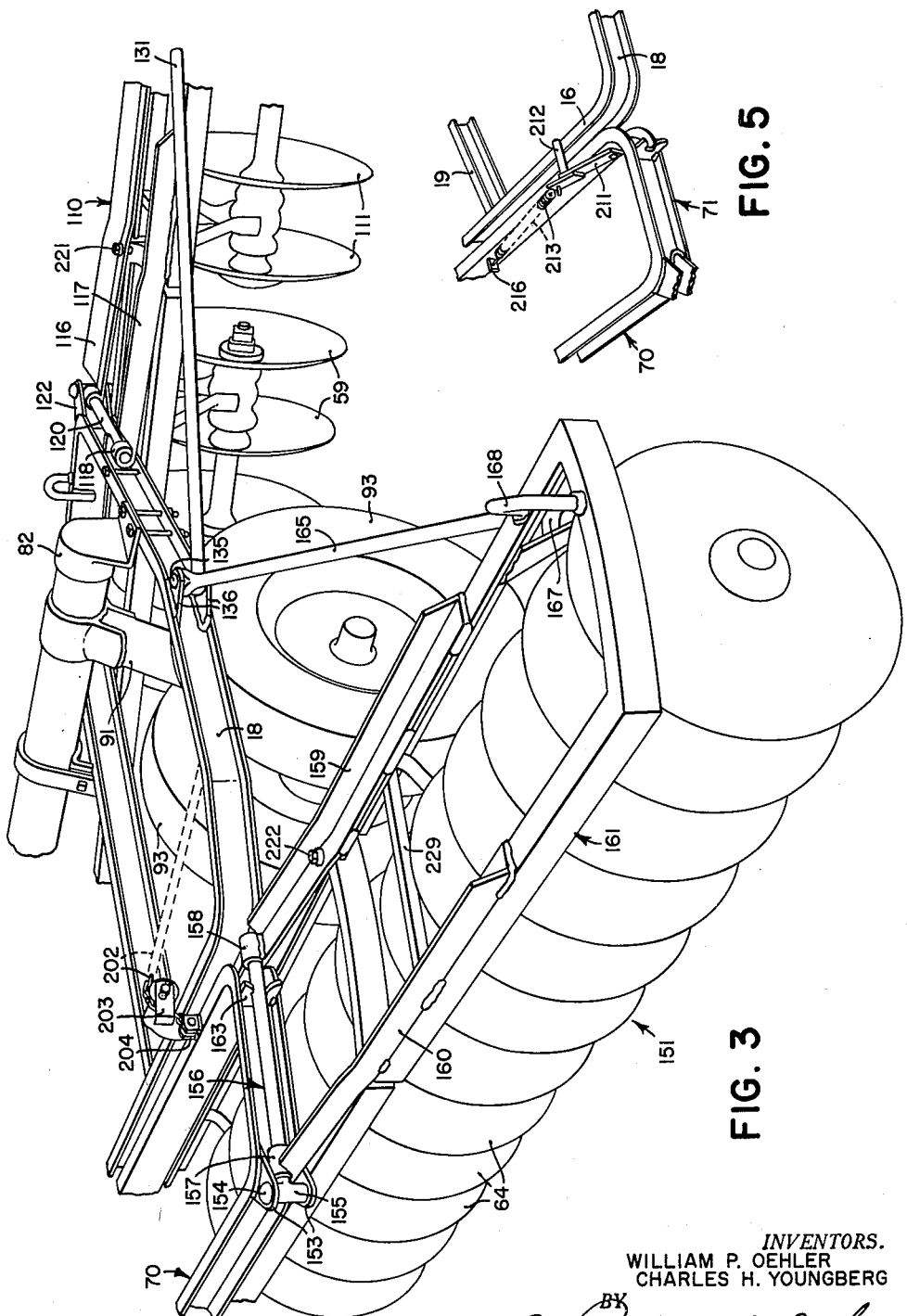

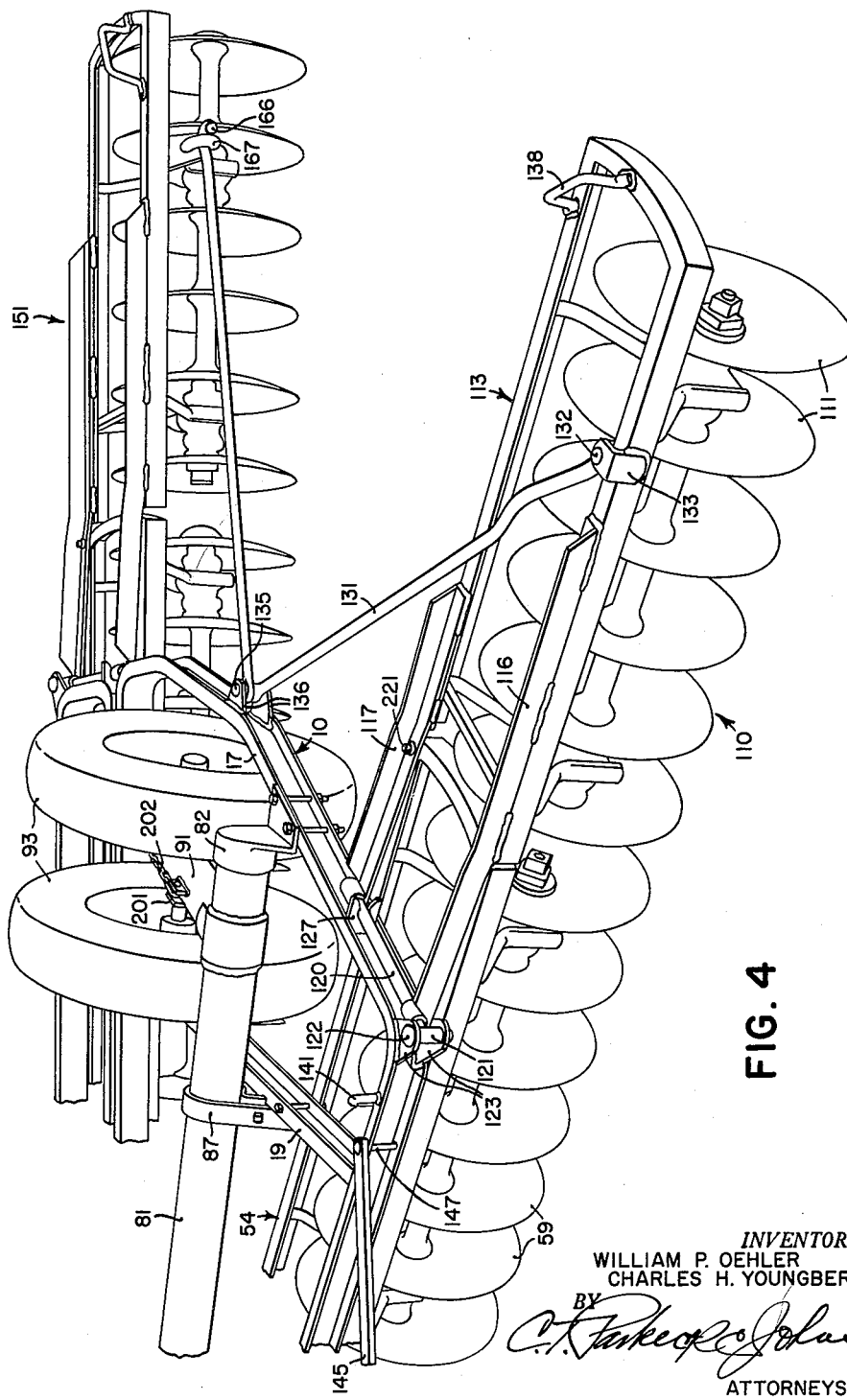

2,985,247

DISK HARROW WITH EXTENSION GANG

William P. Oehler and Charles H. Youngberg, Moline, Ill., assignors, by mesne assignments, to Deere and Company, a corporation of Delaware Continuation of abandoned application Ser. No. 507,274, May 10, 1955. This application Nov. 17, 1958, Ser. No. 774,260

22 Claims. (Cl. 172—413)

This application is a continuation of our copending application, Ser. No. 507,274, filed May 10, 1955, for Disk Harrow With Extension Gangs, now abandoned.

The present invention relates generally to agricultural implements and more particularly to disk harrows of the double acting or tandem type with extension gangs.

The object and general nature of the present invention is the provision of a substantially rigid wheel type harrow so constructed and arranged that the rear disk gang assembly, including both right and left hand disk gangs, is permitted to swing relative to the first gang assembly about a generally fore-and-aft extending centrally located longitudinal axis, whereby the harrow is enabled to operate at substantially uniform depths even though the ground surface is uneven and irregular.

A further feature of this invention is the provision of a disk harrow of the foregoing type, having means to prevent the rear disk gang assembly from moving about the longitudinal axis when the harrow is raised on its supporting wheels for transport, in which position both the front and rear gang assemblies are held out of contact with the ground. A still further feature of this invention is the provision of means acting to hold the rear gang assembly against pivoting when the harrow is in its transport position, which means is connected with the supporting wheel means whereby the movement of the latter into a lowered or transport position, raising the frame and disk gangs, automatically effects a stop or limit to the permissive movement of the rear gangs.

An additional feature of this invention is the provision of a wheel type generally rigid harrow in which extension gang units are pivotally connected at the outer ends of the main gang units and shiftable into and out of alined positions with respect to the main disk gangs, especially when the harrow is arranged for transport, so as to facilitate passage of the harrow through gates, narrow lanes or other restricted spaces. It is a further feature of this invention to provide a wheel type harrow having extension gangs, in which the parts are so constructed and arranged that the harrow is substantially balanced on its supporting wheels, when in the transport position, both when the extension gangs are extended in a wide-spread working position and also when the disk gangs are folded for transport. An additional feature of this invention is the provision of means facilitating the movement and support of the extension gangs in their transport or folded position, whereby the movement of the extension gangs into and out of their folded positions is greatly facilitated.

A further feature of this invention is the provision of new and improved upthrust-resisting means carried by the extension gangs of the rear gang assembly and acting against the main frame of the rear gang assembly to prevent the outer ends of the gang extensions from raising out of the proper position, under the influence of soil pressure acting against the lower portions of the disks. Further, it is a feature of this invention to so construct and arrange said upthrust-resisting means that it is automatically brought into and out of operative relation with respect to the main frame of the rear gang assembly by the movement of the rear gang extension into and out of working position.

These and other objects and advantages of the present invention will be apparent to those skilled in the art after a consideration of the following detailed description, taken in conjunction with the accompanying drawings, in which:

Fig. 1 is a perspective view of a wheel type double-action harrow in which the principles of the present invention have been incorporated, the harrow being viewed from the right rear portion and the extension gangs being shown in their folded position.

Fig. 2 is a fragmentary perspective view, taken from the left-hand front portion of the implement and showing in particular the manner of supporting the left-hand front extension gang in its folded position, the right-hand gang being supported in substantially the same way.

Fig. 3 is an enlarged fragmentary perspective view showing the right-hand rear extension gang in its extended or operating position.

Fig. 4 is a fragmentary perspective view showing the left-hand front extension gang in its extended or operating position.

Fig. 5 is a fragmentary view of a modified form of rear gang assembly lock.

Fig. 6 illustrates a modified form of the present invention in which means is provided for holding the outer ends of the rear gang extensions down against undesirable upward displacement.

Referring first to Fig. 1, the disk harrow of the present invention comprises a main frame 10, a front gang assembly 11 and a rear gang assembly 12, the frame and gang assemblies being supported, especially in transport, by a wheel frame means 13. The main frame means 10 comprises a generally horizontal frame of generally hourglass configuration and made up of suitably interconnected front and rear frame bars 15 and 16 and end bars 17 and 18. Preferably, these frame bars are in the form of channels suitably welded or otherwise rigidly interconnected to form a strong rigid frame. The front and rear bars 15 and 16 may be interconnected by a plurality of crossbars 19. Also forming a part of the main frame 10 is a central generally fore-and-aft extending pipe member 22 to which front and rear connecting plates 23 are secured, as by welding, the frame bars 15 and 16 being connected, as by bolt 24, to the pipe brackets 23, as best shown in Fig. 2. A front drawbar 27 forms a part of the main frame structure and comprises a pipe member 28 having a swivel or other suitable connection 29 at its front end by which the implement may be connected to a tractor or other suitable source of power. At its rear end the drawbar pipe 28 carries a pair of laterally spaced apart arms 31 (Fig. 2) that are apertured and receive a pivot member 32 carried by similar brackets 33 fixed, as by welding, to the forward end of the main frame pipe member 22. The rear end of the drawbar pipe member 28 also carries upper and lower pairs 35 and 36 of spring-receiving brackets, each pair of which is apertured to receive a trunnion member 37 through which the front end of an associated spring-carrying rod 38 is extended. The rear end of each of the rods 38 is formed as an eye and is swingably carried by a pivot member 41 fixed or otherwise supported by a pair of vertical bars 42 mounted for swinging movement on or, if desired, supported by the pivot member 32. The position of the vertical bars 42 relative to the front end of the main frame member 22 is controlled by adjusting means 44. Such means includes a generally fore-and-aft extending adjusting screw 45 extending through threaded swivels 46 and 47, one carried by the upper end of the adjustable bars 42 and the other supported by bracket means 48 welded or otherwise fixed to the front end of the frame pipe member 22. Thus, by turning the member 45 in one direction or the other, the angular position of the spring-receiving member 42, movable about an axis defined by the pivot pin 32, may be adjusted so as to change the reaction point of a pair of upper and lower compression springs 49 that are mounted on the rods 38. The function of the springs 49 and associated parts is to yieldingly hold the front frame or drawbar member 28 in the proper position relative to the frame of the harrow, whereby the connecting swivel 29 may be disposed at the proper elevation to receive the drawbar of the tractor that propels the implement. In other words, turning the adjusting member 45 adapts the front end of the drawbar 28 to the height of the drawbar of the tractor to which the implement is to be connected.

The front gang assembly 11 comprises main disk gang means including a right-hand main disk gang 52 and a left-hand main disk gang 53, each including a gang frame 54 fixed in any suitable way, as by bolts 55 and 56, to the main frame 10 so as to form a rigid part thereof. The inner ends of the rear bars of the gang frames 54 are connected directly to the fore-and-aft extending main pipe member 22 by a bracket 57 (Fig. 1). Each of the main disk gangs 52 and 53 includes a plurality of ground-working disks 59 arranged in generally conventional manner, the gangs being disposed at an angle to the direction of forward travel, which angle is in this type of harrow non-adjustable.

The rear main disk gangs are indicated at 61 and 62 in Fig. 1, and each includes a main disk gang frame 63 and generally conventionally arranged disks 64. The rear disk gang frames 63 are not fixed rigidly to the main frame 10, as are the front main disk gang frames 54, but instead the two rear disk gang frames 63 are fixed in any suitable way, as by bolts 67, to a transversely disposed oscillatable frame 70 that is made up of suitably interconnected, right and left-hand generally U-shaped frame members 71, preferably in the form of channel members bent into the desired U-shaped configuration. The inner end portions of the U-shaped frame members are fixed to front and rear brackets 73, and the latter in turn are welded to a short pipe section 74 that is rockably mounted on the rear end of the main frame pipe member 22, which end of the pipe member 22 extends rearwardly beyond the rear main frame section 16 and into the pipe member 74, whereby the latter is rockably supported thereon. The rear gang assembly is held onto the rear end of the pipe 22 by means of a tie link 75 loosely connected at its rear end to a pair of lugs 76 fixed to the forward portion of the pipe member 74 and at its forward end to a similar pair of lugs (not shown) welded or otherwise fixed to the rear portion of the main frame pipe member 22.

The supporting means for carrying the disk harrow in transport includes the wheel frame structure 13 mentioned above. The wheel frame means 13 comprises a generally transversely extending pipe member 81 the ends of which are rockably mounted in a socket-type bearing 82 fixed, as at 83, to the associated main frame end member 17, as best shown in Fig. 2. The other end of the transversely extending wheel frame pipe member 81 is supported in a similar socket type bracket 82 fixed in the same manner to the main frame, as best shown in Fig. 1. Also, the wheel frame pipe member 81 is mounted for rocking movement at its central portion on a saddle member 85 and held in place thereon by a pair of straps 86 bolted or otherwise connected to the saddle member 85. A similar strap member 87 connects the end portion of the wheel frame pipe member 81 with a saddle member 88 that is fixed to the associated main frame cross member 19. Fixed to each end of the rockable wheel frame pipe member 81 is a wheel carrying arm member 91 to the lower end of which a transversely disposed axle 92 is connected. Mounted on each end of each of the axles 92 is a ground wheel 93, preferably one having a pneumatic tire. Normally, as best shown in Fig. 1, the wheel arms 91 extend generally downwardly and rearwardly, the arms 91 and wheels 93 being shiftable downwardly and forwardly to raise the frame and disk gangs into their transport position.

The wheel frame unit 13, including the ground-engaging wheels 93, is shifted by a hydraulic power unit 95 that includes a cylinder 96 and a piston rod 97. The front end of the cylinder unit is pivotally connected to bracket means 98 fixed to the forward portion of the main frame pipe 22, and the piston rod 97 is connected at its rear end to a loose link 99 that is detachably connected with arm means 101 that, in turn, is connected with the forward end of a link member 102, the rear end of which is pivotally connected to an arm 103, preferably in the form of a pair of brackets 104 fixed to the generally central portion of the wheel frame pipe member 81. Fuid under pressure is delivered to and discharged from the cylinder 96 by a pair of hose lines 107, the latter being usually connected to the power lift system that forms a part of the tractor to which the implement is connected. Under control of suitable valve means on the tractor, the power lift unit 95 may be extended or retracted and, as a consequence thereof, the wheel frame 13 is rocked to raise or lower the frame 10 on the ground wheels 93.

Normally, the adjusting member 45 is turned to such a position that the draft member 28 extends downwardly and forwardly from its connection with the front end of the harrow pipe member 22, the springs 49 being arranged to hold the drawbar 28 of the harrow in this position. This provides means operating automatically to maintain the frame 10 in a generally horizontal position, for the deeper the disks are permitted to cut into the ground, the greater the traction or amount of draft, and the greater the draft, the more the upper spring 49 yields to permit the drawbar 28 to swing upwardly about its transverse pivotal connection 32 with the main frame pipe member 22, thus tending to hold the frame 10 in a level position. Also, when the wheels are lowered to elevate the frame means and associated gangs to a transport position, the springs 49 act as cushioning means for permitting the harrow some flexibility, so far as rocking about the point of support of the wheels on the ground is concerned, but the springs 49 also serve as stabilizing means to prevent oscillation of the harrow about its wheels during transport.

A complete harrow may be constructed as described above, but where the larger tractors are available, there is sufficient power to work a wider strip of ground than the width of just the main frame gangs 11 and 12. According to the principles of the present invention, for farmers whose have the larger tractors, extension gangs are provided, one for the outer end of each of the main frame gangs, and these extension gangs may be arranged in extended position for operation, and in folded position to permit the implement to be drawn through gates, narrow lanes and the like. The extension gangs will now be described.

Each of the extension gangs for the front main gangs is indicated by the reference numeral 110, and the same are shown in their extended position in Fig. 4 and in their folded position in Figs. 1 and 2. The front extension gangs 110 are substantially identical, except that certain parts may be right hand or left hand as required, and therefore a description of one extension gang, such as a left-hand gang as shown in Fig. 2, will suffice. The left-hand extension gang 110, Fig. 2, comprises a plurality of disks 111 connected together by the usual gang shaft structure 112 and carried through suitable bearing means in an extension gang frame 113. The latter is of generally rectangular construction and is provided with front and rear extension angles 116 and 117, the ends of which are formed as eyes or pivot sections 118 by which the extension gang frame is mounted for swinging movement on a pivot member 120. The latter is disposed in a generally horizontal plane and has one end formed as a vertically disposed short sleeve 121 that receives a vertical pivot 122 that is carried by a pair of brackets 123 fixed, as by welding, to the forward laterally outer corner portion of the main frame 10. When the front extension gangs are extended, with their disks 111 disposed in axially outwardly alined relation with respect to the disks 59 of the main disk gang means, the forward end of the swingable pivot member 120 is received in a notched bracket 127 that is welded to the adjacent portion of the main frame end bar 17. A draft link 131 is connected between the extension gang frame 113 and the main frame 10 and comprises a rod-like member having its outer end detachably connected, as by a pin 132, with a bracket 133 fixed to the extension frame 113. The other end of the draft link 131 is pivotally connected to a pin 135 that is supported in a pair of brackets 136 that are fixed to the generally central portion of the main frame end bar 17. As will be seen from Fig. 4, the pivot pin 135 lies in an extended line that passes through the axis of the coupling pivot member 120, whereby there can be up and down swinging of the extension gang, as about the axis defined by the member 120 and the brackets 136, the rear end of the rod member 131 being connected with the pin 135 and the associated parts with such looseness as permits the desired amount of up and down movement of the extension gang. The connecting pins 132 and 135 are easily detachable, and when it is desired to shift the extension gang 110, Fig. 4, from its extended position to its folded position, a handle 138, welded or otherwise fixed to the outer end of the extension gang frame 113, may readily be grasped and, with the link 131 disconnected, the unit 110 may be swung around a vertical axis as defined by the pin 122 into a position in which, as best shown in Fig. 2, the extension gang is disposed in front of the associated main frame gang 54. In order, not only to hold the extension gang 110 in this position but also support the same from the frame of the harrow, whereby lowering the wheels 93 may raise not only the main frame and associated gangs, but also the end gangs or extension gangs, we provide, first, a generally U-shaped lug 141 (Figs. 1 and 2) on the outer forward portion of the main frame 10 and a stud 142 on the side portion of the bracket 33. The stud 142 is adapted to receive the eye end of the draft rod 131 while the other end is adapted to be disposed within the lug 141, as shown in Fig. 2, the rod 131 before being mounted on the part just mentioned being passed under the handle section 138, whereby the link 131 serves, when arranged as in Fig. 2, as means carrying the outer end of the extension gang in its forward position directly on the main frame. In this position, as shown in Fig. 2, the extension gang lies in a substantially transverse position directly in front of the associated main front gang means 11 closely adjacent a bracket bar 145 that extends from the forward portion of the main frame pipe member 22 and the outer portion of the forward section of the main frame 10. Preferably, the front inner end of the bracket bar 145 is bolted, as at 146 (Fig. 2), to the lug 33 and the rear or outer end of the brace bar 145 is connected to a bolt 147, which bolt also cooperates to fix the associated main gang frame 52 to the main frame 10.

As mentioned above, the right-hand front extension gang 110 is substantially the same as the left-hand extension gang 110, and hence further description is unnecessary. Where applicable, the same reference numerals employed for the parts of the left-hand front extension gang have also been used for the corresponding parts of the right-hand front extension gang.

The rear extension gangs are each indicated by the reference numeral 151 (Fig. 1) and are of generally identical construction with the front extension gangs in most particulars. The rear extension gangs 151 are swingable into folded position, as shown in Fig. 1, rearwardly of the associated main disk gang means and are also swingable into a forward or aligned position as can be seen from Figs. 3 and 4. As best shown in Fig. 3, the outer end of the oscillating frame 70 is provided with brackets 153, one pair at each rear corner of the frame 70, the brackets of each pair being apertured to receive a pivot pin 154 that is also disposed in the sleeve section 155 of a pivot member 156 that is normally disposed transversely of the associated gang frame. The pivot member 156 is substantially identical with the pivot member 120 described above in connection with the front extension gangs. The rear extension gang 151 is mounted on the associated pivot member 156 by means of eye sections 157 and 158 that are formed on the laterally inner ends of a pair of frame bars 159 and 160 that are secured, as by welding or the like, to the gang frame 161 of the rear gang extension 151. The outer end of the oscillating frame 70, forwardly of the brackets 153, carries a notched bracket 163 to receive the forward portion of the pivot member 156 when the extension gang is in its extended or working position. To hold the rear extension gang 151 in its extended position, we provide a link 165 having at its forward end an eye that is adapted to receive the pin 135 mentioned above, the pin 135 also being disposed in line with the axis of vertical swinging of the rear extension gang as established by the rear pivot member 156 (Fig. 3). The rear end of the link 165 is formed with a hook section 166 (Fig. 4) that is adapted to be engaged in a draft-transmitting member 167 that is connected with the forward portion of the laterally outer bearing structure of the rear extension gang 151. As will be seen from Fig. 3, the laterally outer and forwardmost corner of the rear gang frame 161 is provided with a manipulating handle 168 similar to the handle 138 described above. Fig. 3 shows the extension gang 151 in extended position, and when it is desired to shift the gang 151 into its folded position, the link 165 is removed from the bracket 136 and the bracket 167, and then the extension gang swung rearwardly and inwardly substantially to a position of parallelism with respect to the associated main gang means, as will be clear from Fig. 1. When the extension gang 151 is in its folded position, the hook end 166 of the link 165 may be engaged with the handle portion 168, as shown in Fig. 1, and the forward end of the link 165 may be connected with a U-shaped bracket 171 formed on the rear portion of the associated main frame bar 19. As will be seen from Fig. 1, the link 165 in this position passes over the rear bar 16 of the main frame, and also over the rear portion of the oscillating frame 70, and thus reacts against the main frame structure to hold the laterally inner end (folded position) of the extension gang 151 in supported relation on the main frame structure, so that when the main frame is lifted by the lowering of the ground wheels 93, the extension gang 151 is also raised and held in a plane generally parallel to the main frame structure. In its folded position, the laterally outer end of the extension gang is carried through the pivot member 156 by the brackets 153.

The left-hand extension gang 151, as shown in Fig. 1, is substantially identical with the right-hand extension gang as just described, and hence further description is unnecessary. Parts of the left-hand extension gang that correspond to the parts described above of the right-hand rear extension gang have been indicated by the corresponding reference numerals.

When the extension gangs are in their extended or operating positions aligned with the corresponding gangs of the main frame, the rear disk gang assembly as a whole pivots on its support on the rear end of the pipe member 22 and in this way accommodates use of the harrow over undulating or uneven ground. That is, the rear disk gang assembly as a whole may swing about a generally fore-and-aft extending axis relative to the front gang assembly and of course the front gang assembly may swing about a generally fore-and-aft extending axis with respect to the propelling tractor, since the connection at 29 is sufficiently loose to allow such relative movement. Therefore, notwithstanding the fact that the harrow of the present invention is fairly wide, the same operates more or less with satisfactory uniformity even though the ground is uneven. When the harrow is to be transported, the power unit 95 is operated to lower the wheels 93, and thus raise the main frame and all parts connected therewith upwardly into a transport position. However, when in transport, it is not desirable to permit the rear disk gang assembly to pivot on the rear end of the bar 22. Also, especially when the extension gangs are in their extended position, it is not desirable to subject the rear end of the pipe member 22 to all of the weight of the rear disk gang assembly. Accordingly, we provide means actuated by the forward and downward swinging of the wheel arms 91 to lock out or prevent any oscillation of the frame 70 relative to the main frame 10, and we further employ the aforesaid means to transmit some of the weight of the frame 70 and associated parts directly to the main frame 10 independently of the support of the frame 70 at its central portion on the pipe member 22. Such means will now be described.

Secured to the rear side of each of the wheel arms 91 is a bracket means 201 to which the forward end of a lifting and stabilizing chain 202 is connected. The rear portion of the chain 202 extends over a roller and bracket structure 203 carried by the rear bar 15 of the main frame 10, and then extends downwardly to a point of connection to the adjacent portion of the oscillating rear frame 70, such connection being effected by a bracket 204 and associated chain-receiving pin means. As will be seen from Fig. 1, there is such a stabilizing chain 202 and associated parts at each side of the implement, and the lengths of the chains 202 are such that when the harrow is in an operating position, as shown in Fig. 4, the wheel arms 91 are generally horizontal and the chains 202 associated therewith are sufficiently slack to permit the entire rear gang assembly to rock, when required by the unevenness of the ground over which the outfit passes, about the axis defined by the rear portion of the main frame pipe member 22. However, when the implement is raised into a transport position and the wheel arms 91 swung downwardly and forwardly, as shown in Figs. 1 and 2, a pull is exerted through the chains 202 which takes out the slack in the chains and pulls up on the ends of the rear gang assembly frame 70, thus not only eliminating any further oscillation of the frame 70 but also relieving the center pivot member (rear of pipe 22) of the weight of the rear gang assembly and transferring it to the main frame through the brackets 203. The feature of permitting the rear gang assembly to oscillate during operation but preventing the oscillation when raised and also relieving the center pivot of at least a portion of the weight of the rear gang assembly when the harrow is in transport is an important feature of the present invention.

In some cases, as when, for example, the extension gangs 110 and 151 are not employed, it may not be necessary to relieve the rear portion of the pipe 22 of the weight of the rear gang assembly, and in that case a somewhat simpler oscillation lock-out means may be employed. For example, referring now to Fig. 5, we secure to each end of the forward bar 70a a swingably mounted arm 211 having a stud 212 overlying the adjacent portion of the rear bar 16 of the main frame 10. A spring 213 is connected at one end to the upper end of the arm 211 and at its other end is anchored, as at 216, to the frame 70. The springs 213 are arranged under sufficient tension to pull the studs 212 down against the adjacent bar of the main frame structure so that, when the harrow is arranged for transport, the frame 70 is held against movement about its support on the pipe member 22. However, the springs 213 do not prevent movement of the rear gang assembly in operating position so that the harrow is capable of following uneven ground surfaces when such conditions prevail.

As will be clear from Fig. 3, the disks of the front extension gangs 110 face outwardly while the disks of the rear extension gangs face inwardly, each of these extension gangs being freely pivoted about the respective hinged connecting rods 120 and 156. Since the soil pressure acting against the lower portions of the disks 111 of the front extension gangs act to hold the outer ends of the extension gangs downwardly, no additional holding means is necessary.

Further, the angles 116 and 117 of the front extension gangs are each provided with an adjustable set screw 221 that, as can be seen from Figs. 2 and 3, cooperates with the adjacent end of the inner gang frame for determining the level of the extension gangs relative to the inner gangs. Likewise, the angles 159 and 160 (Fig. 3) of the rear extension gangs are provided with similar set screw leveling means 222.

In the case of the rear extension gangs, the soil pressure acting against the lower portions of the disks acts outwardly, and this tends to cause the laterally outer ends of the rear extensions gangs to be displaced upwardly. In order to prevent undesirable upward displacement, we provide the rear extension gangs of our disk harrow with the upthrust-resisting means 225 that is shown in Fig. 6. Each of the rear extension gangs is provided with such upthrust-resisting means. Referring now to Fig. 6, the upthrust-resisting means 225 comprises a rod member 226 pivotally connected, as at 227, with a pair of lugs 228 that are fixed to a cross bar 229 that forms a part of the extension gang frame. The rod member 226 extends upwardly and laterally inwardly, when the rear extension gang is in its extended or operating position, and the laterally inner end portion of the rod member 226 is threaded and extended through an aperture in the upper end of an arm 231 that comprises a plate section 232 welded or otherwise secured to a short pipe section 233 that is mounted for rocking movement on the associated pivot member 156. The arm 231 also includes a cam-like plate 235 that is welded to the part 232 and extends laterally inwardly thereof, being provided with an upwardly beveled section 236 and a gang frame engaging section 237. A relatively heavy spring 239 is disposed about the inner end of the rod 226 and is confined between the upper end of the plate section 232 and abutment means in the form of a pair of lock nuts 241 adjustably disposed on the rod 226. The innermost end of the rod also receives a pair of lock nuts 242 that lie at the laterally inner side of the associated arm section 231.

In operation, it will be seen that with the lock nuts 241 and 242 in properly adjusted position, the rod 226 and spring 239 act to hold the cam section 235 in a position to ride up onto the adjacent end of the associated U-shaped frame member 71 when the rear extension gang is swung from its inoperative or transport position (Fig. 1) into its extended or operating position. When the cam section 237 thus engages the rear frame member 71, upward displacement of the laterally outer end of the extension gang is resisted by the spring 39. In this way, the upthrust-resisting means 225 acts between the center frame section of the rear gang assembly and the extension gang to hold the laterally outer end of the extension gang in proper position. However, such means does not interfere with the movement of the extension gang from its working position into its transport position, and vice-versa, the mere act of swinging the extension gang into an operating position automatically establishing the desired anchoring connection between the upthrust-resisting means 225 and the inner frame part 71.

While we have shown and described above the preferred structure in which the principles of the present invention have been incorporated, it is to be understood that our invention is not to be limited to the particular details shown and described above but that, in fact, widely different means may be employed in the practice of the broader aspects of our invention.

What we claim, therefore, and desire to secure by Letters Patent is:

1. In a wheel harrow, a main frame, front and rear disk gang assemblies connected with said main frame, ground engaging supporting wheel means movably connected with said main frame and shiftable to raise and lower said gang assemblies, each of the latter having auxiliary disk gang means swingably connected with said gang assemblies for movement relative thereto into and out of conjoint working position, said wheel means when raised being disposed in a fore-and-aft position corresponding substantially to the position of the center of gravity of the harrow when the auxiliary gang means are in extended working position, and means holding said auxiliary disk gang means in their non-working positions, said latter positions being such that said wheel means when lowered are disposed in a position corresponding substantially to the position of the center of gravity of the harrow when the auxiliary disk gang means are in their non-working position.

2. In a disk harrow, a main frame, a disk gang connected therewith, an extension gang pivotally connected with said first gang and swingable relative thereto between an outward axially aligned position and an inner position arranged generally alongside said first gang, said extension gang including a gang frame pivotally connected at one end with said main frame, a link separate from the extension gang frame and adapted to connect the other end of said extension gang with said main frame, means on the main frame and extension gang frame to connect one end of said link with the main frame and the other end to said other end of said extension gang frame to hold the extension gang in its extended position, and means on the main frame and extension gang frame and spaced from said first mentioned link-connecting means to receive the link in a second position so that the link holds the extension gang in its transport position.

3. The invention set forth in claim 2, further characterized by said link in its second position extending over said first disk gang and acting against the latter to hold said extension gang in its transport position.

4. The invention set forth in claim 2, further characterized by, said extension gang being pivoted to said first gang for movement about a generally vertical axis, said link in its first position extending from the outer end of the extension gang to a point on the main frame spaced in a fore-and-aft direction from the extension gang, and said link in its second position extending across a portion of said main frame and contacting the latter at two generally fore-and-aft spaced points so as to act against the main frame to hold said extension gang against downward displacement out of its transport position.

5. In a disk harrow, a frame, a disk gang connected therewith, an extension gang pivotally connected with said first gang and swingable relative thereto about a generally vertical axis between an outward axially aligned position and an inner position arranged generally alongside but in the same generally horizontal plane as said first gang, a link to connect the outer end of said extension gang with said frame, means on the frame and extension gang to connect one end of said link with the frame and the other end to said extension gang to hold the latter in its extended position, and a separate pair of spaced apart parts on the frame and a part on the outer end of the extension gang to removably receive the link in its inner position so that the link holds the extension gang against downward displacement out of its transport position.

6. The invention set forth in claim 5, further characterized by said last mentioned part being a handle and adapted thereby to facilitate manual shifting of said extension gang between its extended position and its transport position.

7. A harrow comprising a main frame, a main disk gang, an elongated pivot member disposed generally horizontally and swingably connected at one end with said main frame for movement relative thereto about a generally vertical axis, an extension disk gang swingably connected with said pivot member for movement relative thereto in a generally vertical direction about the longitudinal axis of said member, said extension gang being swingable with said pivot member about said generally vertical axis between a position in which the extension gang is aligned in outwardly extending relation and a position generally adjacent one side of the main gang, and means acting in the latter position and connected with the main frame and said extension gang for supporting the latter against downward displacement relative to the main frame with the extension gang disposed adjacent the associated main gang.

8. A wheel harrow of the extension type, comprising a main frame, a main disk gang connected therewith, wheel means movably connected with said main frame and movable relative thereto to raise said frame and said gang, an elongated pivot member disposed generally horizontally and swingably connected at one end with said main frame for movement relative thereto about a generally vertical axis, an extension disk gang swingably connected with said pivot member for movement relative thereto about the longitudinal axis of said member, said extension gang being swingable with said pivot member about said generally vertical axis between a position in which the extension gang is aligned in outwardly extending relation and a position generally adjacent one side of the main gang, and means acting in the latter position and connected with the main frame and said extension for supporting the latter on said frame when the latter is raised by said wheel means.

9. In a disk harrow, a first harrow gang having a gang frame, an elongated pivot member swingably connected at one end to a corner portion of said gang frame for movement in the general plane of said gange frame about an axis generally perpendicular to said plane, and an extension harrow gang having a gang frame swingably connected with said pivot member and swingable in a generally vertical direction about the longitudinal axis of the latter into and out of said plane, said extension gang being swingable with said pivot member about said perpendicular axis from a position aligned with said first gang to a position alongside said first gang, and means releasably supporting the extension gang on the first gang when the extension is swung into its position alongside said first gang.

10. A harrow comprising a main frame, a second frame swingable relative to the main frame for movement about a generally central fore-and-aft extending axis, a first harrow gang having a gang frame fixed to said second frame and swingable with the latter relative to the main frame about said axis, an elongated pivot member swingably connected at one end to a corner portion of said gang frame for movement in the general plane of said gang frame about an axis generally perpendicular to said plane, an extension harrow gang having a gang frame swingably connected with said pivot member and swingable in a generally vertical direction about the longitudinal axis of the latter into and out of said plane, said extension gang being swingable with said pivot member about said perpendicular axis from a position aligned with said first gang to a position alongside said first gang, means connected with said main frame and said second frame for holding the latter and said first mentioned gang-frame against swinging about said fore-and-aft extending axis, and means releasably supporting the extension gang on the first gang when the extension is swung into its position alongside said first gang.

11. A harrow comprising a main frame, a front disk gang connected therewith, a front extension gang pivotally connected at one end with the forward portion of said main frame for movement relative thereto about a generally vertical axis and swingable relative thereto between and outward axially aligned position and an inner position arranged generally alongside said front gang, a link separate from said front extension gang and adapted to connect the other end of said extension gang with said main frame, means on said main frame and said front extension gang to connect one end of said link with the main frame and the other end to said other end of said front extension gang to hold the latter in an extended position, means on the main frame and said front extension gang and spaced from said first-mentioned link-connecting means to receive the link in a second position so that the link holds the front extension gang in its inner position, a rear frame swingably connected with the rear portion of said main frame for movement relative thereto about a generally central fore-and-aft extending axis, a rear disk gang connected with said rear frame, a rear extension gang pivotally connected at its inner end with said rear frame and swingable relative thereto between an outward axially aligned position and an inner position arranged generally alongside said rear gang, a link separate from said rear extension gang and adapted to connect the other end of said rear extension gang with said main frame, means on said main frame and said rear extension gang to connect one end of said latter link with the main frame and the other end to said other end of said rear extension gang to hold the latter in an extended position, means on the main frame and said rear extension gang and spaced from said last-mentioned link-connecting means to receive the link in a second position so that the link holds the rear extension gang in its inner position, and means connected with said main frame and said rear frame for holding the latter and said rear extension gang against swinging about said fore-and-aft extending axis.

12. A harrow comprising a main frame, a main disk gang rigidly connected with the main frame, an elongated pivot member disposed generally horizontally and swingably connected at one end with said main frame for movement relative thereto about a generally vertical axis, an extension disk gang swingably connected with said pivot member for movement relative thereto about the longitudinal axis of said member, said extension gang being swingable with said pivot member about said generally vertical axis between a position in which the extension gang is aligned in outwardly extending relation and a position generally adjacent one side of the main gang, means on said frame to receive the other end of said pivot member when the gangs are aligned, whereby the extension gang may swing generally vertically about an axis that coincides substantially with said longitudinal axis, to accommodate movement of the harrow over uneven ground, and means acting between the main frame and said extension gang to hold the latter against generally fore-and-aft displacement about said vertical axis.

13. A harrow comprising a main frame, a main disk gang rigidly connected with the main frame, an elongated pivot member disposed generally horizontally and swingably connected at one end with said main frame for movement relative thereto about a generally vertical axis, an extension disk gang swingably connected with said pivot member for movement relative thereto about the longitudinal axis of said member, said extension gang being swingable with said pivot member about said generally vertical axis between a position in which the extension gang is aligned in outwardly extending relation and a position generally adjacent one side of the main gang, means on said frame to receive the other end of said pivot member when the gangs are aligned, whereby the extension gang may swing generally vertically about an axis that coincides substantially with said longitudinal axis, to accommodate movement of the harrow over uneven ground, and means acting between the main frame and extension gang to hold the latter in extended position.

14. A harrow comprising a frame carrying a main disk gang, an elongated pivot member disposed generally horizontally and swingably connected at one end with said frame for movement relative thereto about a generally vertical axis, an extension disk gang swingably connected with said pivot member for movement relative thereto about the longitudinal axis of said member, said extension gang being swingable with said pivot member about said generally vertical axis between a position in which the extension gang is aligned in outwardly extending relation with said main disk gang and a non-aligned position, means on said frame to receive the other end of said pivot member when the gangs are aligned, whereby the extension gang may swing generally vertically about an axis that coincides substantially with said longitudinal axis, to accommodate movement of the harrow over uneven ground, and means acting between the frame and the extension gang to hold the latter in aligned position, said last mentioned means comprising an arm swingably mounted on said elongated pivot member, upthrust-resisting means connected between said arm and said extension gang outwardly of said pivot member, and means on said arm adapted to engage the adjacent portion of said frame and hold the arm against inward movement relative to the frame when the extension gang is in its outwardly extending aligned position.

15. In a disk harrow, a pair of gangs swingable about a generally vertical axis into and out of an aligned working position, means interconnecting said gangs so that the outer end of one gang may move upwardly relative to the other gang about a transverse horizontal axis, and spring biased means carried by one gang in a position to operatively engage the other gang when the gangs are shifted generally horizontally into aligned position and prevent upward displacement of the outer end of one gang relative to the other gang.

16. In a disk harrow, a pair of gangs swingable about a generally vertical axis into and out of an aligned working position, means interconnecting said gangs so that the outer end of one gang may move upwardly relative to the other gang about a transverse horizontal axis, an arm pivotally connected with the inner end of said one gang, spring means connected to act between the outer end portion of said arm and said one gang outwardly of said arm, and means on said arm located thereon so as to act against the adjacent portion of said other gang, when said one gang is shifted about said vertical axis into said working position aligned with said other gang, so that said spring means serves to resist upward movement of said one gang about said horizontal axis.

17. In a disk harrow, a pair of gangs swingable about a generally vertical axis into and out of an aligned working position, means interconnecting said gangs so that the outer end of one gang may move upwardly relative to the other gang about a transverse horizontal axis, an arm pivotally connected with the inner end of said one gang, spring means connected to act between the outer end portion of said arm and said one gang outwardly of said arm, and a cam-like section on said arm constructed and arranged to engage the adjacent portion of said other gang, when said one gang is shifted about said vertical axis into said working position aligned with said other gang, whereby said other gang holds said arm against inward movement and the spring means is thereby adapted to react against said arm so as to resist upward movement of said one gang about said horizontal axis.

18. A harrow comprising a frame, a disk gang connected with the frame, an elongated pivot member disposed generally horizontally and swingably connected at one end with said frame for movement relative thereto about a generally vertical axis, an extension disk gang swingably connected with said pivot member for movement relative thereto about the longitudinal axis of said member, a generally vertical arm pivotally mounted at its lower end on said pivot member, the upper end of said arm being apertured, a strut member pivotally connected at its outer end with said extension gang outwardly of said pivot member and slidably disposed at its inner end in said arm aperture, upthrust-resisting spring means disposed on said strut member and acting between the latter and said arm, and a cam section on said arm and engageable with the adjacent portion of said frame when the extension gang is in its extended position, said cam section being disconnected from said frame when the extension gang is shifted about said vertical axis out of alignment with the gang.

19. In a disk harrow, a main frame, a disk gang connected therewith and including a first gang frame fixed to said main frame and extending at its outer end outwardly of said main frame, an extension gang including an extension gang frame, attaching means extending inwardly from the latter frame and swingable relative to said main frame about generally vertical and horizontal axes, to carry the extension gang frame into and out of a position aligned with said first gang frame, said attaching means comprising a part extending generally horizontally and pivoted for movement about a vertical axis relative to said first gang frame, and means swingably connecting the extension gang frame to said part for movement relative thereto about a generally horizontal axis, and said attaching means being spaced so as to overlie and engage the outer extended portion of said first gang frame so as to limit the downward movement of said extension gang frame.

20. A harrow comprising a main frame, a main disk gang connected with the main frame, an elongated pivot member disposed generally horizontally and swingably connected at one end with said main disk gang for movement relative thereto about a generally vertical axis, an extension disk gang swingably connected with said pivot member for movement relative thereto about the longitudinal axis of said member, said extension gang being swingable with said pivot member about said generally vertical axis between a position in which the extension gang is aligned in outwardly extending relation and a position generally adjacent one side of the main disk gang, means on said main disk gang to receive the other end of said pivot member when the gangs are aligned, whereby the extension gang may swing generally vertically about an axis that coincides substantially with said longitudinal axis, to accommodate movement of the harrow over uneven ground, and means acting between the main disk gang and extension gang to hold the latter in extended position.

21. The invention set forth in claim 20, further characterized by said last mentioned means comprising an arm swingably mounted on said elongated pivot member, upthrust-resisting means connected between said arm and said extension gang outwardly of said pivot member, and means on said arm adapted to engage the adjacent portion of the main frame and hold the arm against inward movement relative to the main frame when the extension gang is in its outwardly extending position.

22. In a disk harrow, frame means, a disk gang connected therewith and including a first gang frame connected with said frame means and extending at its outer end outwardly of said frame means, an extension gang including an extension gang frame, attaching means extending inwardly from the latter frame and swingable relative to said frame means about generally vertical and horizontal axes, to carry the extension gang frame into and out of a position aligned with said first gang frame, and said attaching means being spaced so as to overlie and engage the outer extended portion of said first gang frame so as to limit the downward movement of said extension gang frame, and upthrust-resisting means connected between said frame means and said extension gang frame to hold the latter in said aligned position, said upthrust-resisting means comprising means carried by and movable with said extension gang when the latter swings about said vertical axis and a part engageable with the frame means and shaped so that when the extension gang is swung into a position aligned with said first gang frame said frame means acts against said part and biases the upthrust-resisting means to apply downward pressure to said extension gang.

References Cited in the file of this patent

UNITED STATES PATENTS

| | | |
|---|---|---|
| 1,846,005 | Hoffman | Feb. 16, 1932 |
| 1,927,458 | Klise | Sept. 19, 1933 |
| 2,002,272 | Mowry | May 21, 1935 |
| 2,298,161 | Robinson | Oct. 6, 1942 |
| 2,327,834 | White | Aug. 24, 1943 |
| 2,377,521 | Rutter | June 5, 1945 |